United States Patent [19]

Wehrmacher

[11] Patent Number: 4,752,679

[45] Date of Patent: Jun. 21, 1988

[54] RECEPTACLE DEVICE

[75] Inventor: William H. Wehrmacher, Prior Lake, Minn.

[73] Assignee: Datakey, Inc., Burnsville, Minn.

[21] Appl. No.: 20,745

[22] Filed: Mar. 2, 1987

[51] Int. Cl.⁴ ............ G06K 7/06

[52] U.S. Cl. ............ 235/382; 235/443

[58] Field of Search ............ 235/430, 443, 384, 382; 340/825.31

[56] References Cited

U.S. PATENT DOCUMENTS

| | | | |
|---|---|---|---|
| 3,001,167 | 9/1961 | Chestnutt . | |
| 3,660,831 | 5/1972 | Nicola . | |
| 3,686,659 | 8/1972 | Bostrom . | |
| 3,761,892 | 9/1973 | Bosnyak . | |
| 3,889,501 | 6/1975 | Fort . | |
| 4,297,569 | 10/1981 | Fliers | 235/443 |
| 4,326,125 | 4/1982 | Flies | 235/443 |
| 4,379,966 | 4/1983 | Flies | 235/443 |
| 4,420,794 | 12/1983 | Anderson . | |
| 4,522,456 | 6/1985 | Wehrmacher | 339/17 R |
| 4,620,088 | 10/1986 | Flies | 235/443 |

FOREIGN PATENT DOCUMENTS

| | | |
|---|---|---|
| 1321529 | 2/1962 | France . |
| 1427825 | 10/1973 | United Kingdom . |

*Primary Examiner*—Roy N. Envall, Jr.
*Attorney, Agent, or Firm*—Vidas & Arrett

[57] ABSTRACT

An improved receptacle for a key-like device containing an embedded electronic circuit component with electrical leads extending to the surface of the key to form electrical contact areas thereon. The receptacle defines a keyway in which a plurality of exposed contact pins are positioned and spaced inside the receptacle to correspond to the spacing of the electrical contact areas on the key-like device for mating therewith upon insertion of the key device. The receptacle includes a protection sleeve which functions as a guard means for the contact pins. The receptacle is designed to be combined with a printed circuit board by insertion of the outer ends of the contact pins, wich extend through and out of a side of the receptacle, into the circuit board. The contact pins may be received into a variety of predetermined patterns of connectors on the circuit board facilitating electrical connection of the receptacle contact pins to a variety of standardized electrical connectors. Wave soldering may be used to attach the receptacle contact pins to the printed circuit board.

5 Claims, 3 Drawing Sheets

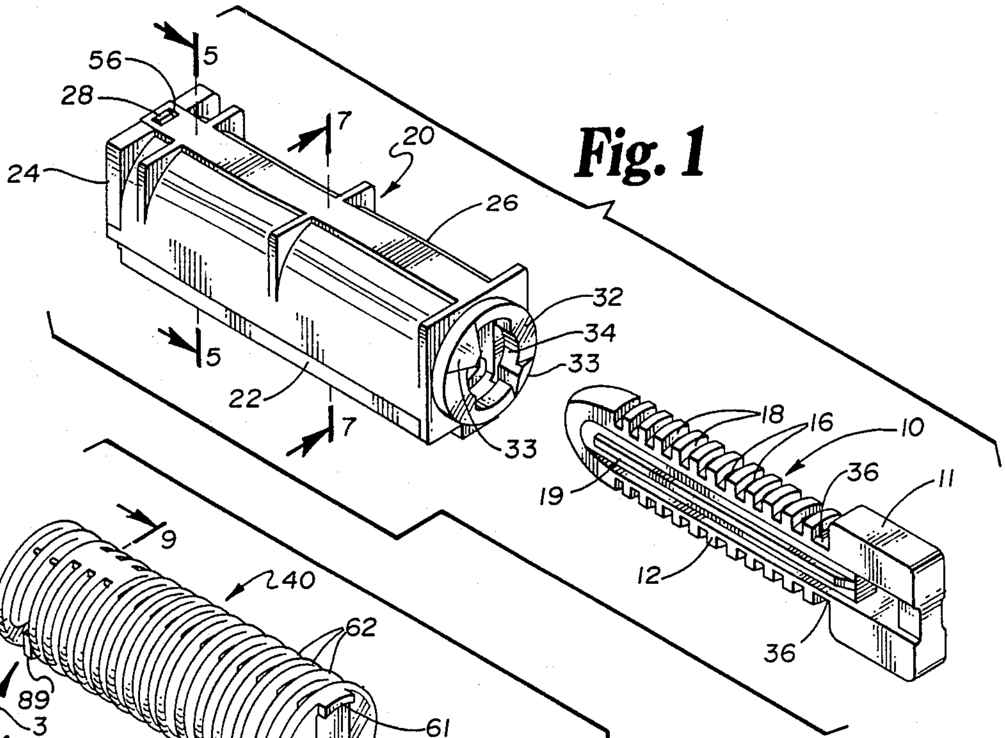
Fig. 1
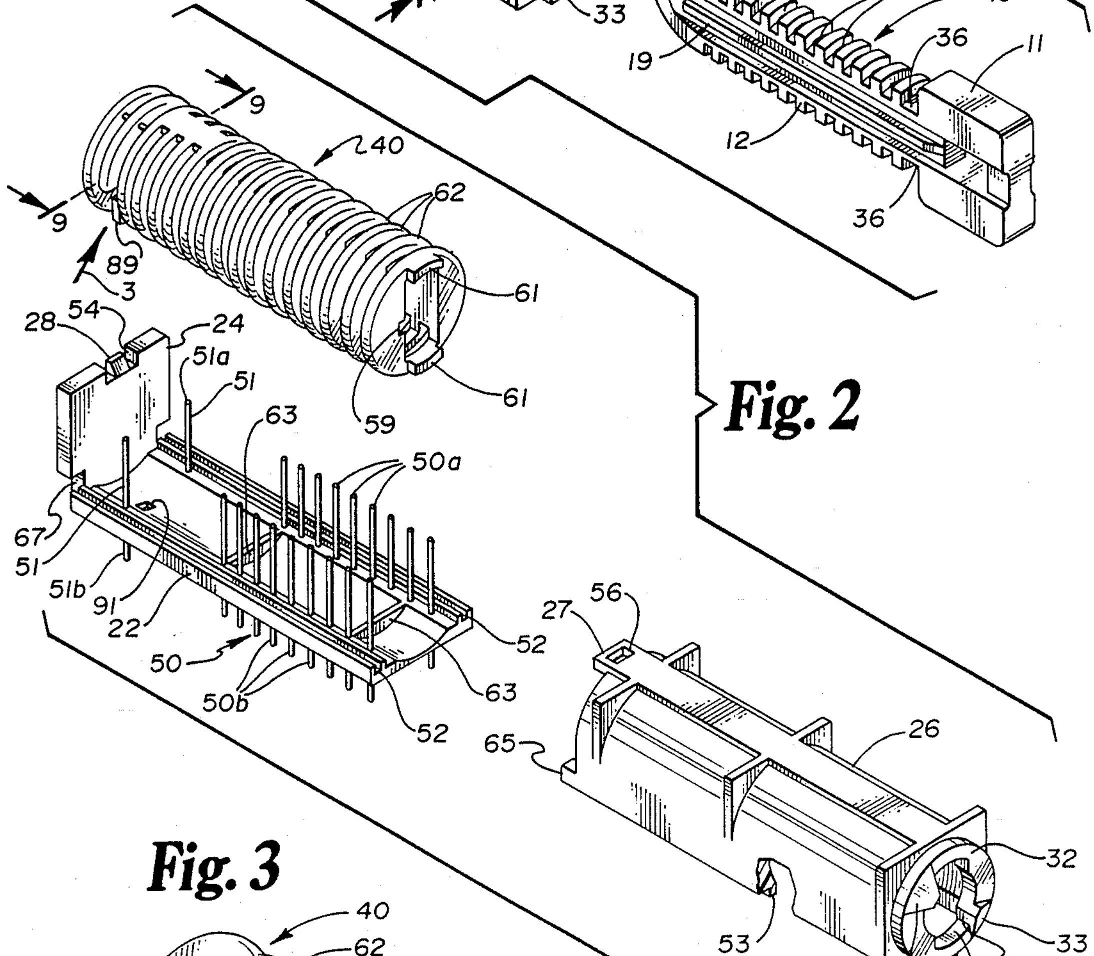
Fig. 2
Fig. 3
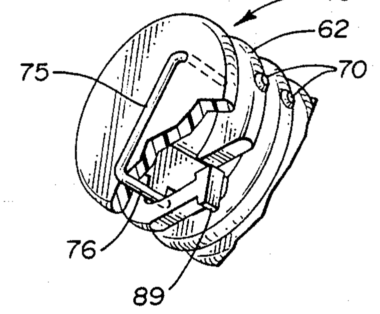

RECEPTACLE DEVICE

BACKGROUND OF THE INVENTION

This invention relates to improvements in the functional design of electrical receptacles for use in combination with electrical key-like devices. The invention is an improvement over U.S. Pat. No. 4,620,088, issued Oct. 28, 1986, entitled "Receptacle Design for use with Electronic Key-Like Device"; U.S. Pat. No. 4,297,569, issued Oct. 27, 1981, entitled "Microelectronic Memory with Receptacle and Systems Therefor"; and U.S. Pat. No. 4,326,125, issued Apr. 20, 1982, entitled "Improved Microelectronic Memory Key with Receptacle and Systems Therefor" all of which are incorporated herein by reference.

The referenced prior art discloses electrical key-like devices in which a master circuit or electrical operating system of some kind, such as a computer system, is activated by use of a portable key-like device which is combined with the electrical system, as by insertion into a suitable receptacle or the like, to make electrical contact or connection with the system. This invention is concerned broadly with such portable devices and with their use in such systems. This invention relates to an improved design for the receptacle of such systems which lessens the number of manufacturing steps required for assembly, as well as eliminating a number of components to provide substantial cost savings in mass production.

More specifically, this invention concerns an improved receptacle for receiving electrical key-like devices and providing electrical connection between such devices and a computer or other master circuit operating system. The key-like devices of the referenced prior art and of this patent application retain relatively large amounts of data bits (information) in a portable medium of small size. Very fast data access and data transfer rates are provided by electrical connection of such devices to a master electrical circuit means which includes a program memory and a processor, through insertion of the key-like device into a specially designed electrical receptacle. It is desirable that the receptacle have a design which provides good electrical contact with the computer, even after prolonged usage or tampering. It is also desirable that the electrical contacts in the receptacle be protected from casual damage when the receptacle is not in use, as well as protecting the contact pins from the deliberately inflicted damage and improper usage. It is also desirable to provide an improved receptacle design such that the receptacle may be soldered directly onto a printed circuit board. It is an aim of this invention to fulfill these and other objectives which will be become apparent hereinbelow.

BRIEF SUMMARY OF THE INVENTION

The aforementioned patents describe a key-like device which, in the preferred form of a microelectronic data key, provide relatively large amounts of data bit storage with very fast access time while being packaged in a durable medium. The microelectronic data keys described therein are not only concerned with the storage of data (information) and its introduction into a computer or other electrical circuit, but also with the portability of microelectronic circuit chips or dies, whether the purpose of the electrical cicuit system into which the key is introduced is the storage of information or any other purpose, such as a control function.

The various circuit elements which may be embedded in the key are packaged in a sturdy configuration for insertion into a receptacle. The receptacle is connected to an access device or the like for a variety of purposes. Any circuit means which can be so packaged and which can augment any other existing circuit contained in a master operating system or the like is usable in such keys. The key-like devices are specifically designed for insertion into an electrical receptacle and rotation therein to establish contact through the receptacle to the master electrical system.

The present invention specifically relates to improvements in the design of such receptacles, lessening the number of steps required in the manufacture of the receptacle, and eliminating some of the components previously required. The present invention also allows for the receptacle to be soldered directly to a printed circuit board, eliminating the previously required connective components as well as allowing the receptacle to be fitted into smaller areas. For example, it may then be fitted onto an expansion board in a digital computer, including personal computers, or to other circuit boards, particularly those designed to fit in small areas. Additional features, such as the receptacle design, interior and exterior key stop features, a "click-feel" or "tacticle" feel feature enabling the user to determine when the key has been turned sufficiently in the receptacle to become active, as well as various other features are included.

BRIEF DESCRIPTION OF THE DRAWINGS

FIG. 1 is a pictorial exploded view of the receptacle and key;

FIG. 2 is a pictorial exploded view of the elements of the receptacle;

FIG. 3 is a detail pictorial view, slightly enlarged with part cut away, and taken from the position indicated by arrow 3 in FIG. 2;

DETAILED DESCRIPTION OF THE INVENTION

Figure 4:
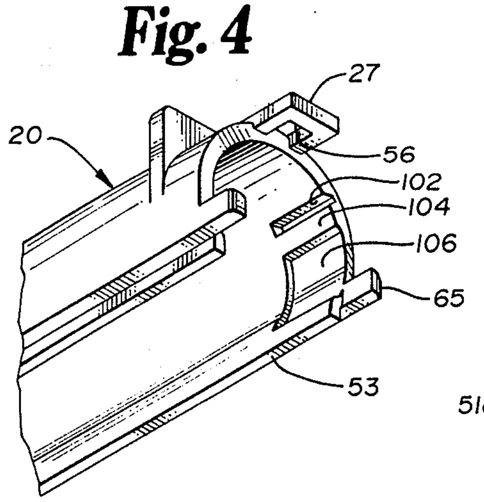
FIG. 4 is a detail pictorial view, slightly enlarged and taken from the position indicated by the arrow 4 in FIG. 2.

In FIG. 1, a portable random access data device or key-like device generally designated 10, and referred to hereinafter simply as the "key", is shown. Key 10 comprises nonconductive head and insert body portions 11 and 12 respectively. The insert body portion 12 contains a circuit element, such as an integrated circuit or microelectronic chip embedded therein (not shown). Leads 16 of the circuit element extend therefrom through the body portion of the key to the upper and lower surfaces thereof where they lie exposed within spaced contact grooves 18 to form electrical contact areas on the key. Body 12 also includes an external registration rib 19 to assure correct orientation of the key for insertion into the receptacle generally indicated at 20.

As shown in more detail in FIG. 2 receptacle 20 comprises a contact support member 22, an end wall member 24 attached to contact support member 22 and a cylindrical-like enclosure member 26. End wall member 24 contains a latch tab member 28. Enclosure member 26 contains a latch tab 27 which is designed to snap fit over latch member 28 when enclosure member 26 is mounted on and attached to contact support member 22. End wall member 24 also contains cut-out portions 67 which admit enclosure ends 65, aiding in providing a tightly fit receptacle. Enclosure member 26 also contains front flange 32 which surrounds a keyway opening 34. Front flange 32 includes raised key-stop portions 33 which act to stop the rotation of the key by abutment of the stops against keyhead 11. Opening 34 is preferably a compound shape comprising a generally rectangular slot which permits insertion of the key insert portion 12 into the receptacle and a generally circular central expansion area, the diameter of which corresponds generally to the thickness of the key between grooves 36 located adjacent head portion 11 of the key. The shape of keyway opening 34 cooperates with grooves 36 so that the key may not be rotated until it is fully inserted into receptacle 20. Additionally, once rotation has begun, the key may not be removed until it is returned to the insertion position.

As is seen in FIG. 2, receptacle 20 is a multi-part assembly which includes contact support member 22, end wall member 24 integrally attached to contact support member 22, enclosure 26, and guard member 40, all of which are preferably formed of molded plastic. Preferably, contact support 22 is made of polyphenylene sulpide; guard member 40 is made of nylon, and enclosure 20 is made of acetal.

Contact support 22 also contains a plurality of inwardly and outwardly extending finger-like spring contact pins 50, the inner ends being indicated at 50*a*, the outer ends being indicated at 50*b*. Preferably, these pins are made of Paliney ® type 6 or 7 metal available from the Ney Company. Stainless steel may also be used. The contact support 22 is preferably molded around contact pins 50 as shown. There are also a pair of parallel grooves 52 along the outside edges of contact support 22. These runner grooves act as a guide and seat for ridges or runners 53 on enclosure 26. Thrust web members 63 are positioned to fit between discoid elements 62 (described below) of guard means 40, preventing the guard means from moving forward or backward along contact support 22 when it is mounted thereon. A separated pair of contact pins 51 with inner ends 51*a* and outer ends 51*b* are also carried by support 22 in the same way as pins 50. Pins 51 serve a switching function (LOFO), as later described, while pins 50 serve to electrically contact a key upon insertion and turning in the receptacle.

End wall member 24 contains a centered depression 54 on its upper surface in which a latch tab member in the form of an upwardly extending tab 28 is carried. The latch member tab is used to snap fit inside the latch opening 56 contained on enclosure 26 in rearwardly extending horizontal tab 27.

Figure 8:
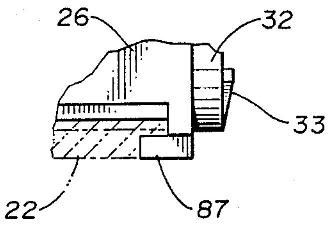
FIG. 8 is a partial side elevational detail, slightly enlarged and taken at arrow 8 in FIG. 2.

Referring to FIG. 8, enclosure member 26 may also include tab 87 which snap fits over contact support 22, aiding in providing a tightly fit enclosure 26.

Figure 6:
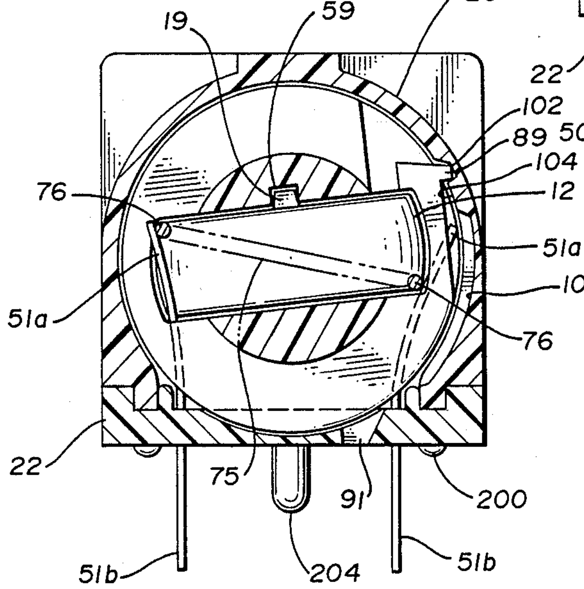
FIG. 6 is a view similar to that of FIG. 5 with some elements in a second position.
Figure 7:
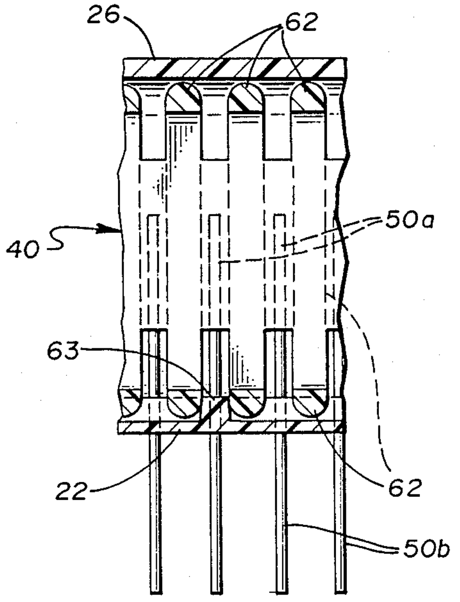
FIG. 7 is a partial sectional elevation taken along line 7—7 of FIG. 1.
Figure 9:
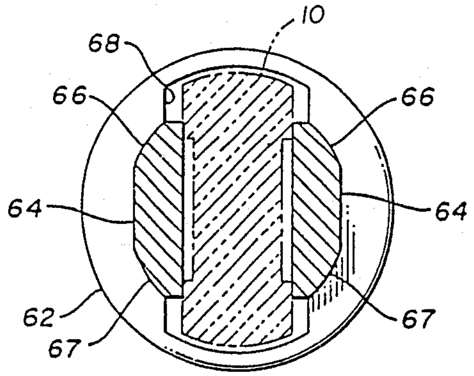
FIG. 9 is a face on cross-sectional view of the rear of the guard means taken at 9—9 in FIG. 2.

A contact pin protect sleeve or guard means 40 as shown in FIG. 2 comprises a generally tubular structure of cylindrical shape preferably, although various cross-sectional shapes may be utilized so long as the structure is rotatable within an appropriate shaped chamber of enclosure 26. As can be seen from FIG. 4, the interior surfaces of enclosure 20 are suitably curved to facilitate rotation of cylindrical guard means 40 therein. FIGS. 3, 7 and 9 should also be referred to in addition to FIG. 2 for details concerning the structure of guard means 40. From these Figures, it can be seen that the guard is formed of a plurality of discoid elements 62 concentrically spaced along a common axis and interconnected by two oppositely disposed rows of paired rib elements 64 (best seen in FIG. 9). Preferably, rib elements 64 will have inwardly tapered tops and bottoms 66 and 67 as can be seen in FIG. 9. The discoid elements 62 contain aligned openings 68 which, along with the rib-like elements 64, define a keyway into which a key-like device, such as key 10, may be inserted when guard means 40 is carried within the enclosure 26. As can be seen from FIG. 2, guard means 40 may be mounted on contact support 22 with enclosure member 26 seated in grooves 52 by means of runners 53 to snap fit with latch member 28 thereby forming the assembled electrical receptacle 20. The keyway defined by discoid elements 62 and rib elements 64 has an open top and open bottom (best shown in FIG. 7) between the spaced discoid elements, the sides of which are closed by rib elements 64. A key registration groove 59 (best seen in FIGS. 2 and 6) is also included in guard means 40. The key registration rib 19 included on key 10 fits into key registration groove 59 thereby preventing insertion of the key in a predetermined orientation. Head spacers 61 are also included on guard member 40 for key positioning purposes when the guard member is rotated with the key (best seen in FIG. 2). The head spacers 61 also serve to increase the torque required to rotate the key to stops 33. Spacers 61 abut matching stops 33*a* inside enclosure 26 (See FIG. 2).

As shown in FIG. 3, one or more stops 70 may be carried on the periphery of discoid elements 62 and an appropriate seat 102 (FIG. 4) may be provided in enclosure 20 to afford a positive snap-action rotation of guard means 40 when rotated inside enclosure member 26. Preferably, stops 70 and seat 102 will be so arranged as to position the keyway of guard means 40 in a normally open or upright position, hereinafter termed the "guard" position (shown in FIG. 5), in which the rib elements 64 are positioned along the sides of enclosure member 20 such that contact pins 50 lie between rib elements 64 which separate contact pins 50 from keyway 34, thus preventing their exposure when a key is not inserted into the receptacle. Upon insertion of a key and rotation thereof, guard means 40 rotates with the key to a position, as shown in FIG. 6, whereby contacts 16 on the key are able to contact the contact pins 50 through the open top and bottom, which have been respectively rotated to the sides thereof, of the keyway defined by the guard means.

Figure 5:
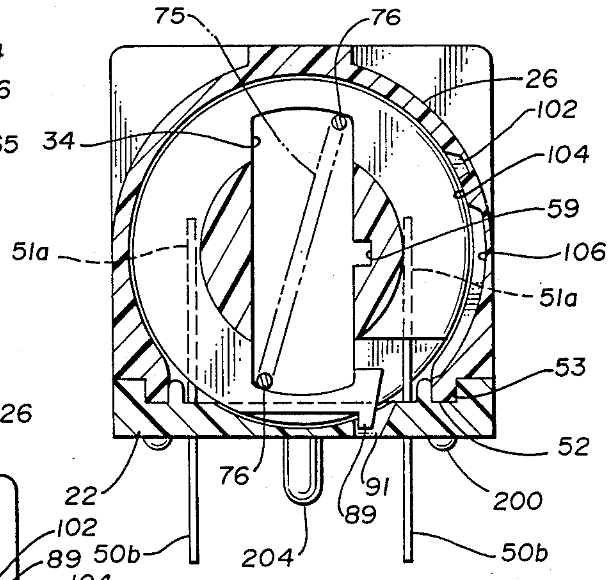
FIG. 5 is a sectional elevation taken along line 5—5 in FIG. 1 and shown slightly enlarged.

Guard means 40 also may include detent beak 89 (best seen in FIGS. 3 and 5). As the guard means 40 is rotated, detent 89 snaps out of cut-out 91 located on the contact support. This provides an audible "click" to denote the beginning of rotation, while stops 70 provide an audible "click" to denote the end of rotation.

The receptacle will also preferably include a switch element referred to herein as a last-on-first-off (LOFO) switch, the purpose of which is to render certain that all contact pins 50 are completely contacted by all key contacts 16 before the LOFO switch is closed allowing electrical connection between the key contacts, the receptacle contacts and the operating circuitry. Preferably, the LOFO switch will comprise a pair of contact pins 51 identical to pins 50 disposed at the wall member end of contact support 22 and a shunt in the form of a U-shaped or staple-shaped wire 75 inserted into the last pair of discoid elements 62, as shown in FIG. 3, at the distal end of guard means 40. As can be seen in FIGS. 3, 5 and 6 the staple 75 is arranged a few degrees from vertical so as to lag behind the rotational movement of the key contacts 16 when a key is rotated in keyway 34 to engage contact pins 50 in the receptacle. Consequently, contact by legs 76 of shunt member 75 to the oppositely disposed contact pins 51 in the receptacle will lag contact between the key contacts 16 and contact pins 50, making certain that all key/receptacle contacts are positively engaged before legs 76 contact the corresponding receptacle contact pins 51 to complete electrical connection between all contacts and the operating circuit.

FIG. 4 shows enclosure 20 allowing a view of the inside of the enclosure. Latch opening 56 is shown formed at the inner end of enclosure 20 by means of tab 27. Runners 53 are constructed to fit into grooves 52 of the contact support member 22. The open detent 102, the snap-over area 104 and the free area 106 all interact with stops 70 on guard member 40 to provide an audible click and feel for determining when the key has been turned a sufficient amount.

Referring now to FIGS. 5 and 6, these Figures show the positions of the guard member upon insertion and rotation of key 10, respectively. FIGS. 5 and 6 are a rear view of the receptacle with the rear of the enclosure in sillouette so as to enable the viewer to see the interior portions of the receptacle. As the key is turned (clockwise in these views) staple 75 with legs 76 comes into contact with contact pins 51 only after the contacts 16 on key 10 have completed contact with all other contact pins 50. Also shown in FIGS. 5 and 6 are positioning elements 200 and 204 which may be distributed in various areas on the underside of support 22. These elements allow the assembled receptacle to be seated on a computer board and determine the positioning of the bottom portion of the contact pins with respect to the board for wave soldering purposes. Contact pin outer ends **50*b* and 51*b* fit through holes on a circuit board while the receptacle rests on elements 200 or 204**. The ends of the contact pins are then soldered from the underside of the circuit board.

Whereas the invention has been described in detail with reference to certain embodiments for purposes of illustration, it should be understood that variations may be made without departing from the essential features of the invention which are set forth in the following claims.

What is claimed is:

1. An electrical receptacle which is electronically activated by insertion and rotation of an electronic key-like device having electrical contact surface areas thereon for mating with corresponding contacts in the receptacle, the receptacle consisting of:

(a) an electrical contact support member, having adjacent spaced inner and outer surfaces;

(b) a set of spaced electrical contact pins arranged along said contact support, the pins being fixed in the support and extending therethrough such that each pin has free opposite ends extending away from said support on both the inner and outer surfaces thereof, respectively;

(c) a guard member defining a keyway, the member being constructed and arranged to allow access to the contact pins only when the key-like member is inserted into the keyway and rotated approximately 90 degrees, and (d) an enclosure member which mounts above the inner surface of said contact support, the member covering said guard member and leaving at least one end freely accessible to the key-like device.

2. The receptacle of claim 1 in which the contact support has at least one track on the inner surface and running parallel to the outer edge of said inner surface, and wherein said track is between said contact pins and said outer edge.

3. The receptacle of claim 1 in which a wall member is attached to one end of said contact support, said wall member extending upward from said inner surface

4. The receptacle of claim 1 in which the guard member is comprised of:

(a) a pair of elongated wall shields, and (b) a plurality of disks attached to the wall shields such that the faces of the wall shields are parallel such that said disks are parallel to each other.

5. The guard member of claim 4 wherein one end of said guard member is covered by a slotted member and the opposite of said guard member is sized and shaped to fit said key-like device.

* * * * *